US012463389B2

(12) United States Patent
Wang et al.

(10) Patent No.: US 12,463,389 B2
(45) Date of Patent: Nov. 4, 2025

(54) TELECOMMUNICATIONS JACK ADAPTER

(71) Applicant: CommScope Technologies LLC, Hickory, NC (US)

(72) Inventors: Jing Wang, Jiangsu (CN); Wenyong Wu, Jiangsu (CN)

(73) Assignee: CommScope Technologies LLC, Claremont, NC (US)

( * ) Notice: Subject to any disclaimer, the term of this patent is extended or adjusted under 35 U.S.C. 154(b) by 334 days.

(21) Appl. No.: 18/002,257

(22) PCT Filed: Jul. 2, 2021

(86) PCT No.: PCT/US2021/040362

§ 371 (c)(1),
(2) Date: Dec. 16, 2022

(87) PCT Pub. No.: WO2022/006549

PCT Pub. Date: Jan. 6, 2022

(65) Prior Publication Data

US 2023/0231347 A1 Jul. 20, 2023

(30) Foreign Application Priority Data

Jul. 2, 2020 (CN) ......................... 202010634338.8
Jul. 2, 2020 (CN) ......................... 202021290352.2

(51) Int. Cl.

*H01R 13/74* (2006.01)
*H01R 24/64* (2011.01)
*H01R 107/00* (2006.01)

(52) U.S. Cl.

CPC ........... *H01R 13/745* (2013.01); *H01R 24/64* (2013.01); *H01R 2107/00* (2013.01)

(58) Field of Classification Search

None
See application file for complete search history.

(56) References Cited

U.S. PATENT DOCUMENTS 4,875,881 A 10/1989 Caveny et al.
5,041,018 A * 8/1991 Arnett .................. H01R 13/741 439/676

(Continued)

FOREIGN PATENT DOCUMENTS

FR 2 701 345 A1 8/1994
FR 3018143 A3 9/2015

(Continued)

OTHER PUBLICATIONS

International Search Report and Written Opinion for Application No. PCT/US2021/040354 mailed Oct. 27, 2021.

(Continued)

*Primary Examiner* — Abdullah A Riyami

(74) *Attorney, Agent, or Firm* — Merchant & Gould P.C.

(57) ABSTRACT

A telecommunications jack adapter for receiving multiple types of jacks can include an opening structure having a main body defining a central opening for receiving a first jack type having a first dimension and a second jack type having a second dimension greater than the first dimension, wherein the main body is flexible such that the opening structure matches the first dimension in a relaxed state and matches the second dimension in an expanded state. In some examples, the main body has deflectable latch members configured to engage with an opening structure configured to receive a third jack type.

22 Claims, 13 Drawing Sheets

(56) References Cited

U.S. PATENT DOCUMENTS 5,096,439 A * 3/1992 Arnett .................. H04M 1/0293 174/66
5,096,442 A * 3/1992 Arnett .................. H01R 13/518 439/676
5,108,053 A * 4/1992 Biederstedt ............ H02B 1/044 248/27.1
5,238,426 A * 8/1993 Arnett ...................... H04Q 1/13 248/27.3
5,356,311 A 10/1994 Liu
5,501,608 A * 3/1996 Scheer ................... H01R 31/06 439/76.1
5,599,190 A * 2/1997 Willette ............... H01R 13/518 439/43
5,658,166 A 8/1997 Freeman et al.
5,897,395 A * 4/1999 Arnett .................. H01R 13/743 439/954
6,373,944 B1 4/2002 Beavers
6,623,170 B2 * 9/2003 Petrillo ................ H01R 13/741 385/53
7,056,157 B2 * 6/2006 Herring .................. H01R 31/06 439/680
7,131,864 B2 11/2006 Peng
7,690,921 B2 * 4/2010 Timmins .................. H04Q 1/13 439/49
8,105,097 B2 * 1/2012 Thijs .................... H01R 13/443 439/133
8,341,810 B2 * 1/2013 Rayos ................... F16B 5/0664 224/326
9,326,418 B2 * 4/2016 Knight ................. H05K 7/1492
9,577,396 B2 * 2/2017 Plamondon .......... H01R 43/205
9,640,960 B2 * 5/2017 Makwinski .......... H02G 3/0608
9,887,500 B2 2/2018 Riner
10,181,675 B1 * 1/2019 Anderson ............ A47B 95/002
2002/0031955 A1 * 3/2002 Schmidt ................. H01R 24/64 439/676
2003/0096536 A1 * 5/2003 Clark ................... H01R 13/743 439/676
2006/0019533 A1 * 1/2006 Peng ...................... H01R 31/06 439/536
2008/0050967 A1 * 2/2008 Poulin .................. H01R 13/743 439/567
2009/0093166 A1 * 4/2009 Fogg ...................... H01R 24/64 439/660
2010/0227493 A1 * 9/2010 Guy ....................... H01R 31/06 439/345
2012/0196472 A1 * 8/2012 Fitzpatrick ............. H01R 27/00 439/389
2013/0337687 A1 * 12/2013 Weinmann ......... H01R 13/6461 439/620.01
2014/0220794 A1 * 8/2014 Taylor .................. G02B 6/4292 439/55
2016/0056547 A1 * 2/2016 Fransen ............. H01R 13/6272 439/404
2016/0080836 A1 * 3/2016 Carreras Garcia .... H01R 24/62 439/638

FOREIGN PATENT DOCUMENTS

JP 2002-184534 A 6/2002
JP 2010-34049 A 2/2010

OTHER PUBLICATIONS

International Search Report and Written Opinion for Application No. PCT/US2021/040362 mailed Oct. 27, 2021.
Extended European Search Report for EP21834445.5 mailed Jun. 21, 2024.

* cited by examiner

TELECOMMUNICATIONS JACK ADAPTER

CROSS-REFERENCE TO RELATED APPLICATIONS

This application is being filed as a National Stage Application of PCT International Patent Application PCT/US2021/040362, filed on 2 Jul. 2021, claims the benefit of Chinese Patent Application No. 202010634338.8, filed on Jul. 2, 2020, and claims the benefit of Chinese Patent Application No. 202021290352.2, filed on Jul. 2, 2020, the disclosures of which are incorporated herein by reference in their entireties.

BACKGROUND

Telecommunications connectors are manufactured to various specifications and standards. For example, specifications and standards exist for connecting modular jacks within openings defined by, for example, panels and plates. One industry-wide standard exists for what is typically referred to as a "keystone jack" in which a flexible tab is provided on the top of the jack, among other structural features, that allows the jack to be snapped into a mounting plate. Manufacturers have also defined their own specifications for proprietary and non-proprietary jack types. It is typically the case that a jack made to one specification cannot be used with an opening made to a different specification. Accordingly, this lack of cross-compatibility reduces flexibility and requires manufacturers to maintain large inventories.

With reference to FIG. 26, a keystone jack 10, configured as an RJ-type jack, is presented. As shown, the jack 10 includes a main body 12 and a single-sided deflectable latch member 14 located on one side of the main body 12. A single-sided fixed latch member 16 is provided on the side of the main body 12 opposite the latch member 14. In one aspect, the latch members 14, 16 are separated by a height H1 which allows the jack to be inserted into an opening of the same height. In one example, the height H1 is about 19.5 mm. A pair of oppositely positioned side stops 18 are also provided on the other two sides of the main body 12. When the jack 10 is inserted into an opening, the latch members 14, 16 prevent the jack 10 from being removed in a first direction D1. The side stops 18 prevent the jack 10 from being removed from the opening in a second direction D2 opposite the first direction D1. Accordingly, the combination of the latch members 14, 16 and the side stops 18 function to securely hold the jack 10 within an opening such that the jack 10 cannot be moved in either of the first and second directions D1, D2. When the latch member 14 is sufficiently depressed, the jack 10 can be removed from the opening in the first direction D1.

With reference to FIG. 27, a jack module 20 referred to as an SL series jack, also configured as an RJ-type jack, and manufactured by CommScope, Inc., the assignee of the present application, is presented. As shown, the jack 20 includes a main body 22 and a double-sided deflectable latch member 24 located on one side of the main body 22. A double-sided fixed latch member 26 is provided on the side of the main body 22 opposite the latch member 24. In one aspect, the latch members 24, 26 are separated by a height H2 which allows the jack to be inserted into an opening of the same height. In one example, the height H2 is about 20.3 mm. As the latch members 24, 26 are double-sided and form a channel that abuts each side of a wall defining the opening within which the jack 20 is installed, the latch members 24, 26 prevent the jack 20 from being removed from the opening in either the first or second direction D1, D2. Accordingly, the jack 20 differs from the jack 10 in that side stops need not be provided for the jack 20. When the latch member 24 is sufficiently depressed, the jack 10 can be removed from the opening in the first direction D1. As the height H1 associated with a keystone style jack is different than the height H2 associated with an SL style jack, each style jack must typically be used with an opening structure specifically dimensioned for that style of jack.

With reference to FIG. 29, a jack module 30 referred to as an M series jack, also configured as an RJ-type jack, and manufactured by CommScope, Inc., the assignee of the present application, is presented. As shown, the jack 30 includes a main body 32 and a pair of oppositely positioned single-sided deflectable latch members 34 located on each side of the main body 32. A pair of oppositely positioned side stops 36 are also provided on the same two sides of the main body 12 on which the latch members 34 are provided. When the jack 30 is inserted into an opening structure 40 having a central passageway 42, as shown at FIGS. 29 and 30, the latch members 34 engage into recesses 44 having catch surfaces 46 to prevent the jack 30 from being removed in the first direction D1. The side stops 36 abut a rear-facing surface 48 of the opening structure 40 to prevent the jack 30 from being removed from the opening in the second direction D2 opposite the second direction D2. Accordingly, the combination of the latch members 34 the side stops 36 function to securely hold the jack 30 within an opening structure 40 such that the jack 10 cannot be moved in either of the first and second directions D1, D2. When the latch members 34 are sufficiently depressed, the jack 30 can be removed from the opening structure 40 in the first direction D1.

As the latching approach used with an M series style jack 30 and the opening structure 40 is completely different than that used for keystone and SL type jacks, the opening structure 40 is generally incompatible and unusable for keystone and SL style jacks. Other types of jack styles with differing latch systems also exist that similarly require openings configured specifically for that style of jack.

SUMMARY

A telecommunications jack connection kit can include an opening structure defining a first central passageway, the opening structure defining a first attachment arrangement for securing a first jack type to the main body within the central passageway, and an adapter for connection to a second jack type and a third jack type, the adapter being configured for connection to the first attachment arrangement, wherein the first, second, and third jack types have different connection arrangements for facilitating connection to an opening structure.

In some examples, the first attachment arrangement includes oppositely positioned recesses and catch surfaces located on opposite sides of the first central passageway, the catch surfaces being for engaging laterally positioned latch members of the first jack type.

In some examples, the first jack type is a COMMSCOPE M-series type jack.

In some examples, the second jack type is a keystone type jack.

In some examples, the third jack type is a COMMSCOPE SL-series type jack.

In some examples, the adapter includes a main body defining a second central opening for receiving either of the first and second jack types.

In some examples, the adapter includes a pair of oppositely positioned deflectable latch members for engaging with the catch surfaces of the first attachment arrangement, the pair of latch members being located on first and second side structures on the adapter.

In some examples, the adapter includes a third side structure extending between the first and second side structures, the third side structure defining oppositely facing catch surfaces for engaging with a deflectable latch member of the first or the second jack type.

In some examples, the adapter includes a fourth side structure extending between the first and second side structures, the third side structure defining oppositely facing catch surfaces for engaging with a fixed latch member of the first or the second jack type.

In some examples, the adapter includes a first stop surface for engaging with a corresponding stop surface of the opening structure.

In some examples, the adapter includes a second stop surface for engaging with a corresponding stop surface of the first jack type or the second jack type.

In some examples, the pair of deflectable latch members extend within a recess defined by the first and second side structures, and wherein the main body further includes a first spring arm straddling the first side structure recess and a second spring arm straddling the second side structure recess.

In some examples, the first and second spring arms each have a curved or arched shape.

A telecommunications jack adapter for enabling jacks of a first and second type to be inserted into an opening structure configured for a third jack type can include a main body defining first, second, third, and fourth side structures, the side structures defining a central opening for receiving a jack, a first deflectable latch member formed as part of the first side structure and a second deflectable latch member formed as part of the second side structure, the first and second deflectable latch members being configured to engage with the opening structure configured for the third jack type, a first attachment arrangement for receiving and retaining a first jack type within the central opening, the first attachment arrangement being defined by a first catch surface defined in the third side structure, a second catch surface defined in the fourth side structure, and a first stop surface, and a second attachment arrangement for receiving and retaining a second jack type within the central opening, the second attachment arrangement being defined by the first and second catch surfaces, a third catch surface defined in the third side structure, and a fourth catch surface defined in the fourth side structure, wherein the first, second, and third jack types have different connection arrangements for facilitating connection to an opening structure.

In some examples, the third jack type is a COMMSCOPE M-series type jack.

In some examples, the first jack type is a keystone type jack.

In some examples, the second jack type is a COMMSCOPE SL-series type jack.

In some examples, the adapter includes a second stop surface for engaging with a corresponding stop surface of the opening structure.

In some examples, the first and second deflectable latch members extend within a recess defined by the first and second side structures, and wherein the main body further includes a first spring arm straddling the first side structure recess and a second spring arm straddling the second side structure recess.

In some examples, the first and second spring arms each have a curved or arched shape.

In some examples, the first and second spring arms each define a portion of the first stop surface.

In some examples, the first and second spring arms each define a second stop surface for engaging with a corresponding stop surface of the opening structure.

A telecommunications jack adapter for receiving multiple types of jacks can include an opening structure having a main body defining a central opening for receiving a first jack type having a first dimension and a second jack type having a second dimension greater than the first dimension, wherein the main body is flexible such that the opening structure matches the first dimension in a relaxed state and matches the second dimension in an expanded state.

In some examples, the opening structure is defined by first, second, third, and fourth side structures and the main body further includes a first deflectable latch member formed as part of the first side structure and a second deflectable latch member formed as part of the second side structure, the first and second deflectable latch members being configured to engage with a second opening structure configured for receiving a third jack type.

In some examples, the main body includes a pair of flexible arms enabling the main body to move between the relaxed and expanded states.

In some examples, the adapter further includes a first attachment arrangement for receiving and retaining a first jack type within the central opening, the first attachment arrangement being defined by a first catch surface defined in the third side structure, a second catch surface defined in the fourth side structure, and a first stop surface, and a second attachment arrangement for receiving and retaining a second jack type within the central opening, the second attachment arrangement being defined by the first and second catch surfaces, a third catch surface defined in the third side structure, and a fourth catch surface defined in the fourth side structure, wherein the first, second, and third jack types have different connection arrangements for facilitating connection to an opening structure.

In some examples, the third jack type is a COMMSCOPE M-series type jack.

In some examples, the first jack type is a keystone type jack.

In some examples, the second jack type is a COMMSCOPE SL-series type jack.

In some examples, the first and second deflectable latch members extend within a recess defined by the first and second side structures, and wherein the pair of spring arms includes a first spring arm straddling the first side structure recess and a second spring arm straddling the second side structure recess.

In some examples, the first and second spring arms each have a curved or arched shape.

In some examples, the first and second spring arms each define a portion of a first stop surface.

In some examples, the first and second spring arms each define a second stop surface for engaging with a corresponding stop surface of the opening structure.

A telecommunications jack adapter for receiving multiple types of jacks can include an opening structure defining a central opening for receiving a first jack type having a first height dimension and a second jack type having a second height dimension greater than the first height dimension; a pair of flexible arms connected to the opening structure such that the central opening is located between the flexible arms; wherein when the pair of flexible arms are in a relaxed state, the central opening corresponds to the first height dimension and wherein when the pair of flexible arms are in an expanded state, the central opening corresponds to the second height dimension.

In some examples, the opening structure is defined by first, second, third, and fourth side structures and the main body further includes a first deflectable latch member formed as part of the first side structure and a second deflectable latch member formed as part of the second side structure, the first and second deflectable latch members being configured to engage with a second opening structure configured for receiving a third jack type.

In some examples, the pair of flexible arms each have a curved or arched shape.

In some examples, the pair of flexible arms each define a portion of a first stop surface.

In some examples, the pair of flexible arms each define a second stop surface for engaging with a corresponding stop surface of the opening structure.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
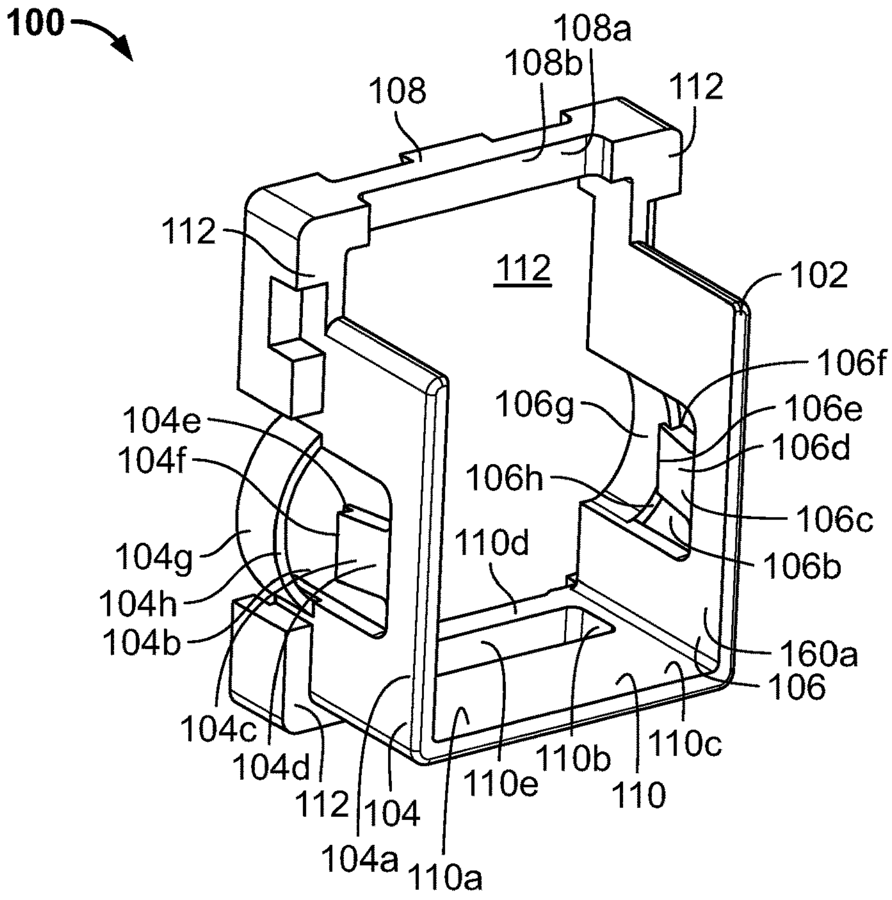
FIG. 1 is a rear perspective view of a telecommunications jack adapter having features in accordance with the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
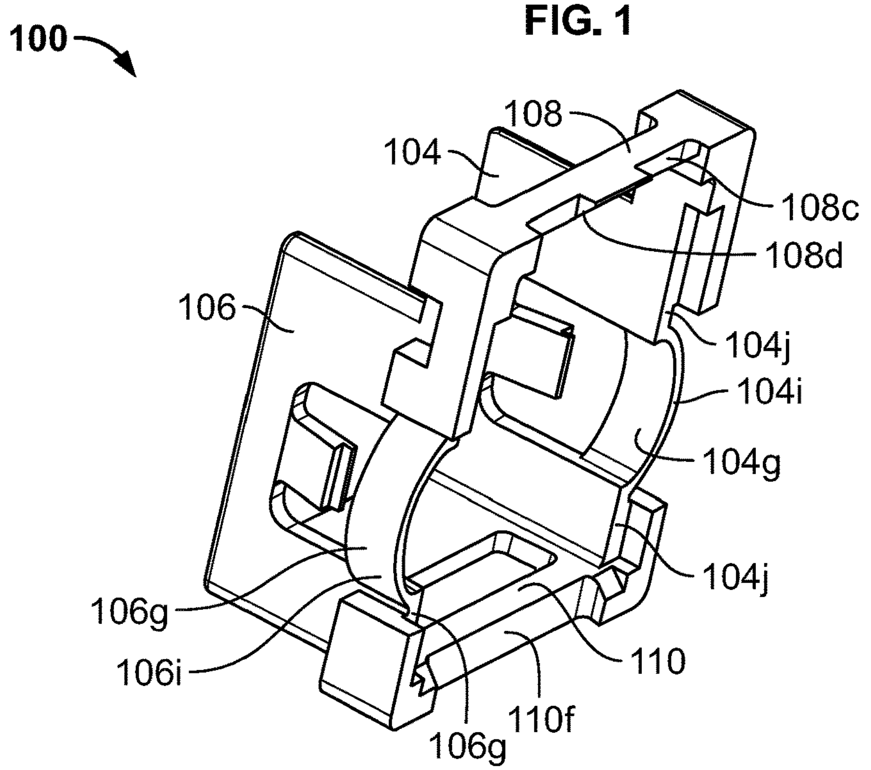
FIG. 2 is a front perspective view of the adapter of FIG. 1.
Figure 3:
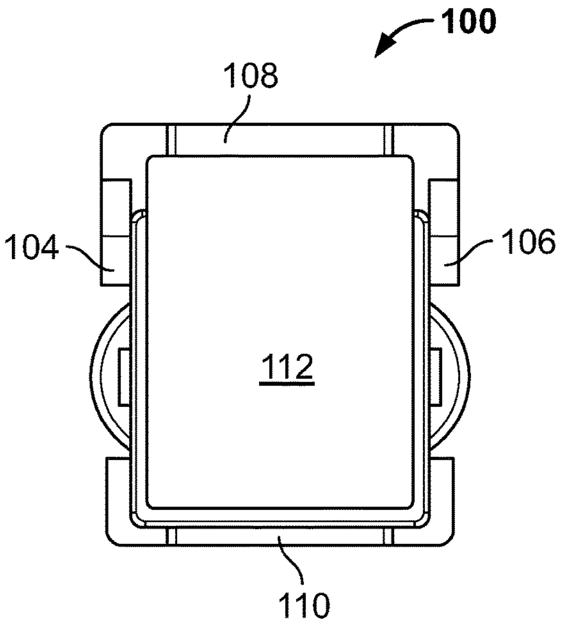
FIG. 3 is a front view of the adapter of FIG. 1.
Figure 4:
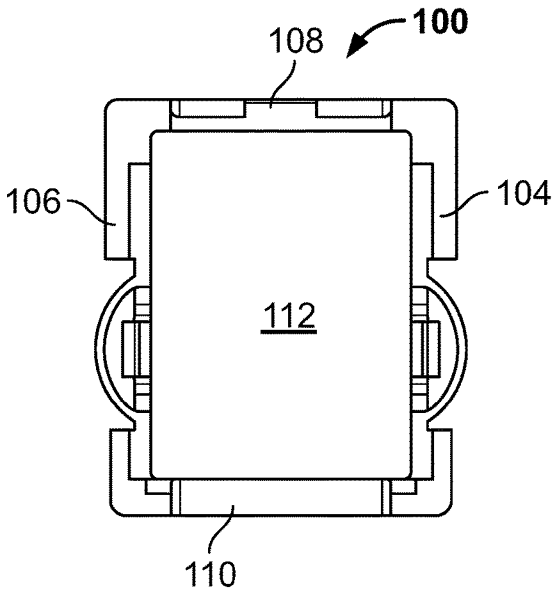
FIG. 4 is a rear view of the adapter of FIG. 1.
Figure 5:
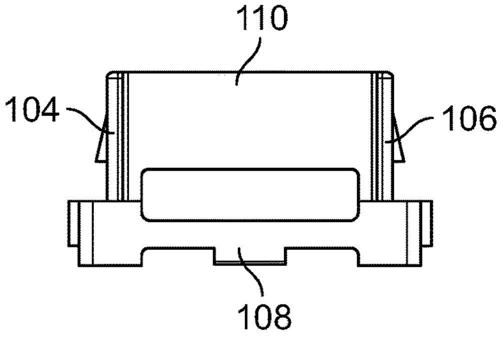
FIG. 5 is a top view of the adapter of FIG. 1.
Figure 6:
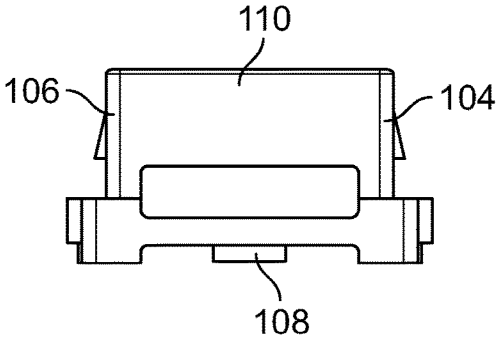
FIG. 6 is a bottom view of the adapter of FIG. 1.
Figure 7:
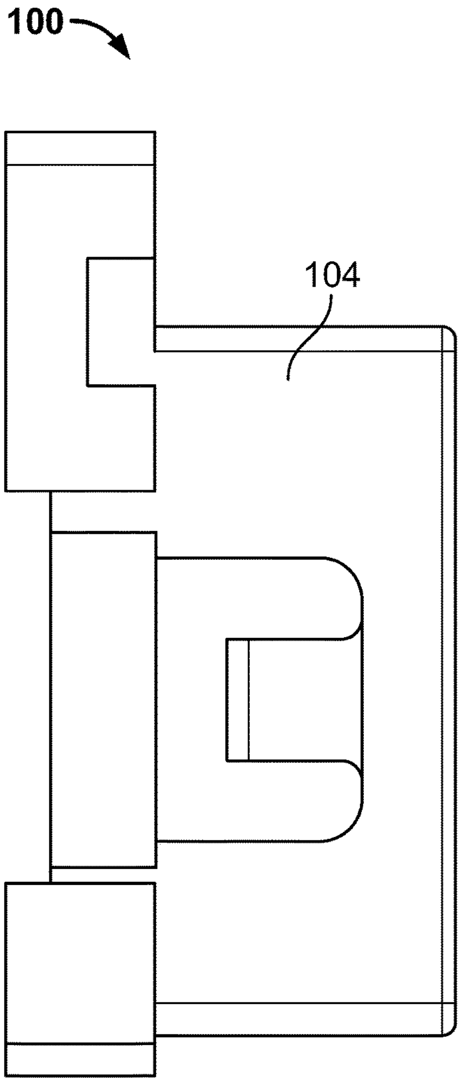
FIG. 7 is a side view of the adapter of FIG. 1.
Figure 8:
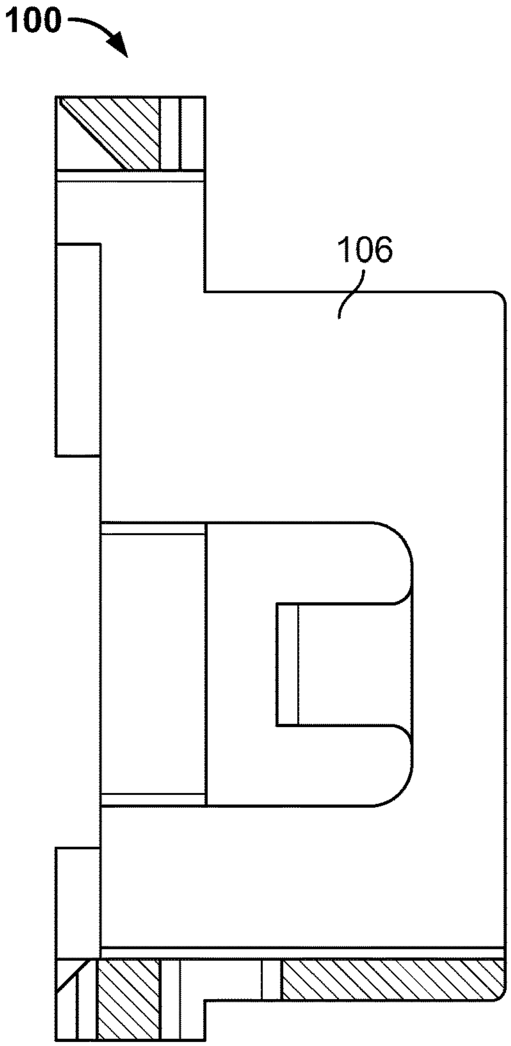
FIG. 8 is a cross-sectional side view of the adapter of FIG. 1.
Figure 9:
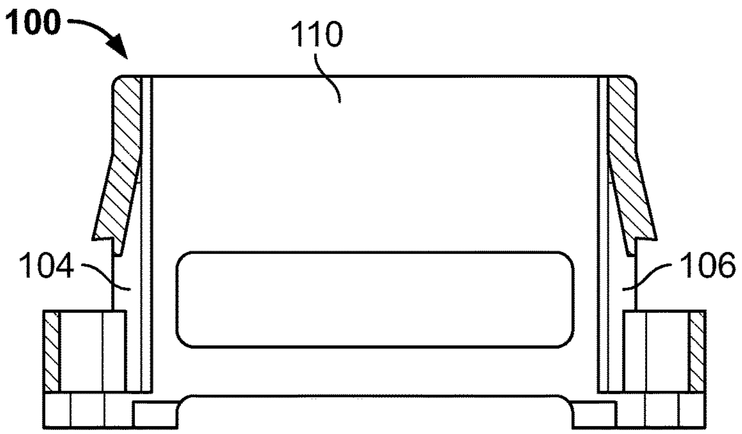
FIG. 9 is a cross-sectional top view of the adapter of FIG. 1.

With reference to FIGS. 1 to 9, and adapter 100 is presented. The adapter 100 can be used with either a keystone-type jack 10 or an SL-type jack 20 such that the jacks 10, 20 can then be inserted into an opening structure 40 configured for an M-series type jack 30.

Figure 16:
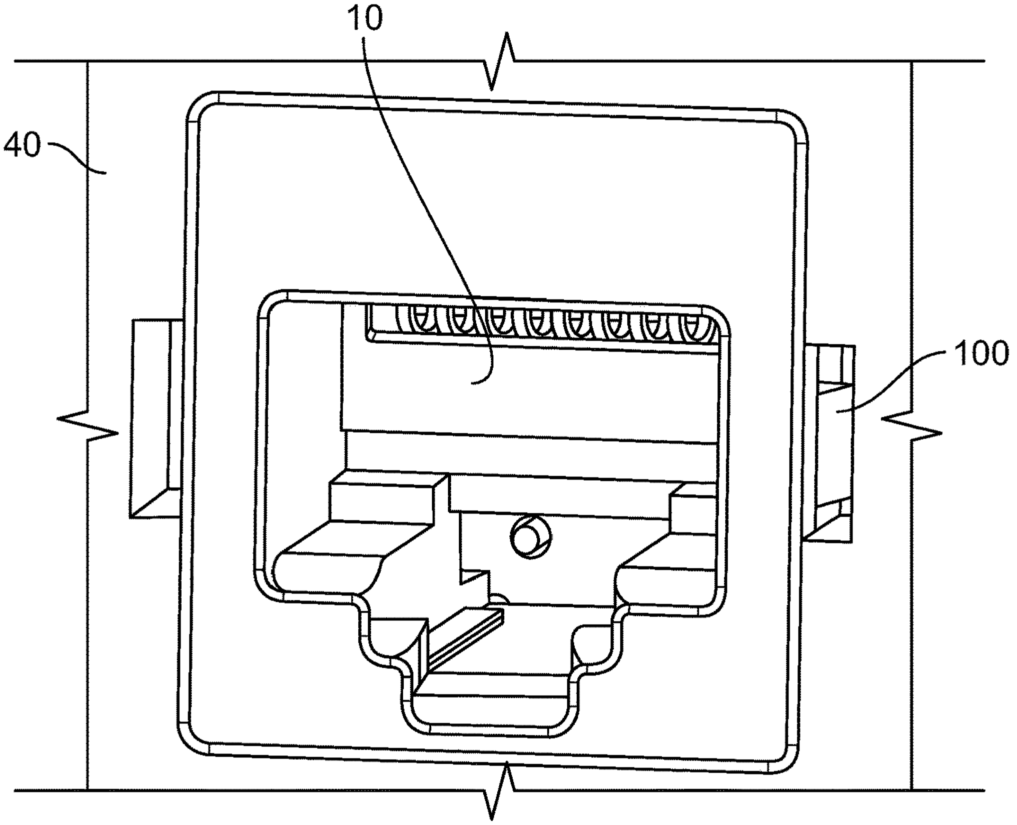
FIG. 16 is a perspective front view of the assembly shown in FIG. 10 installed within an opening structure.
Figure 17:
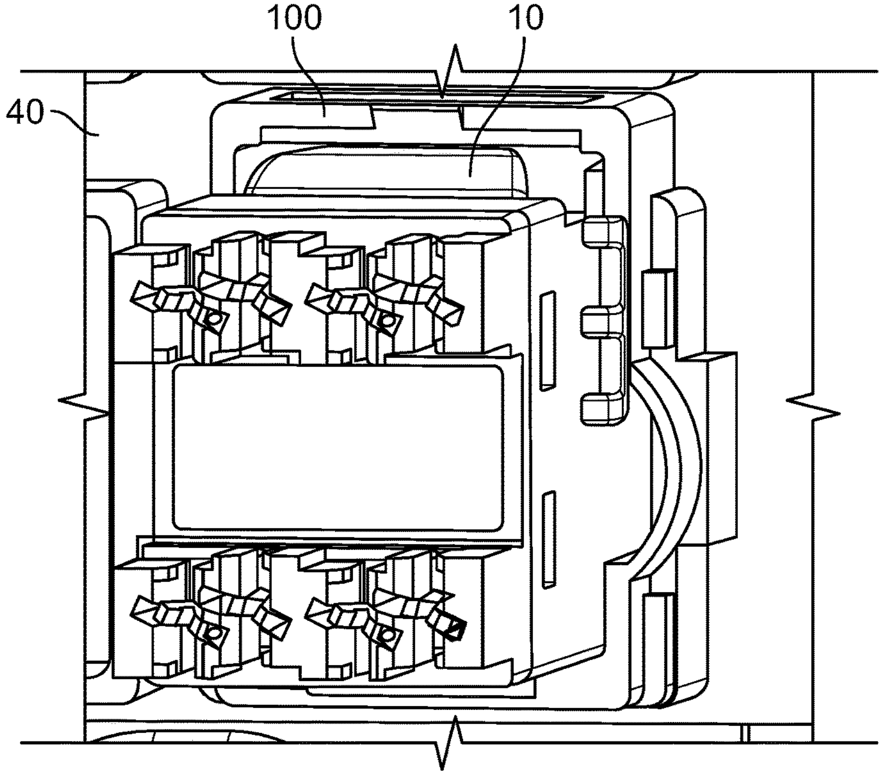
FIG. 17 is a perspective rear view of the assembly and opening structure shown in FIG. 16.
Figure 24:
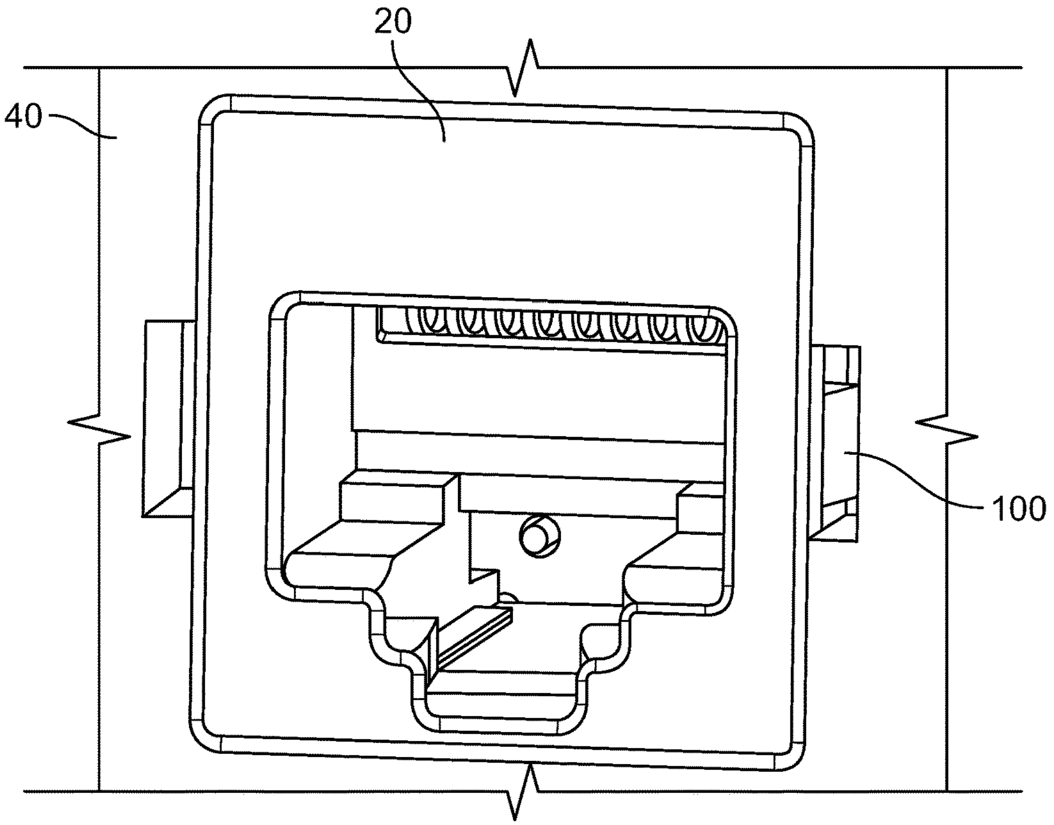
FIG. 24 is a perspective front view of the assembly shown in FIG. 18 installed within the opening structure shown in FIGS. 16 and 17.
Figure 25:
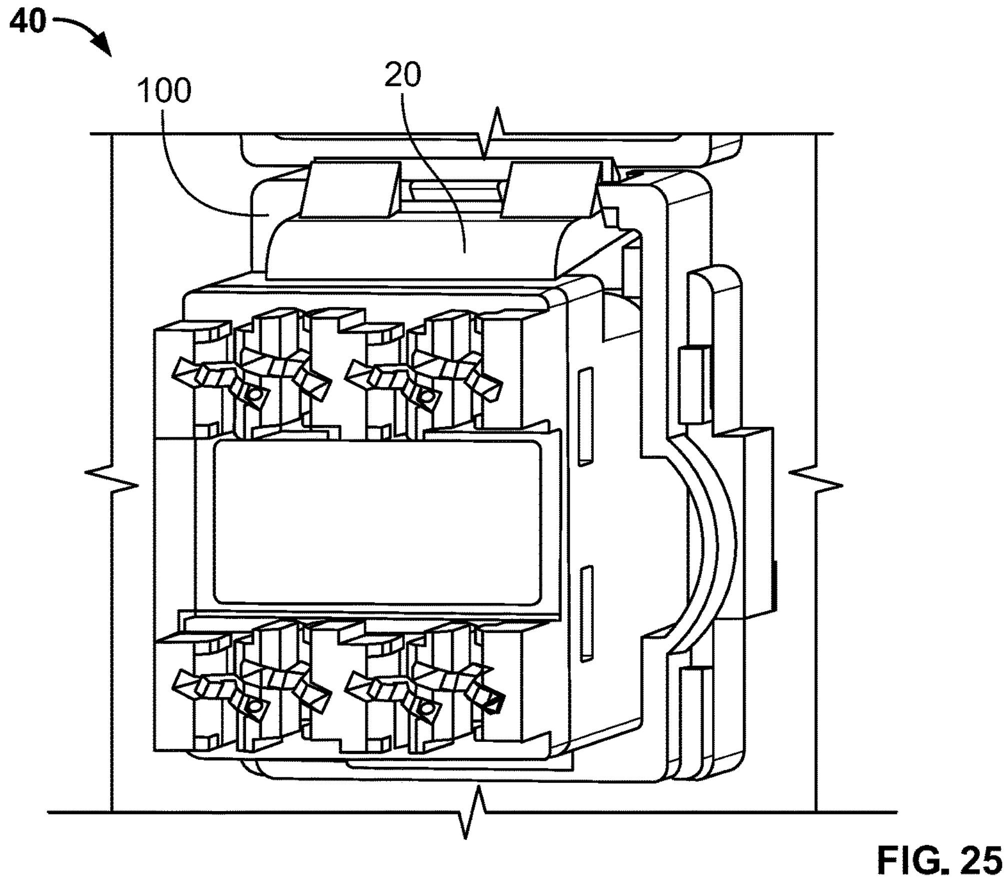
FIG. 25 is a perspective rear view of the assembly and opening structure shown in FIG. 24.
Figure 26:
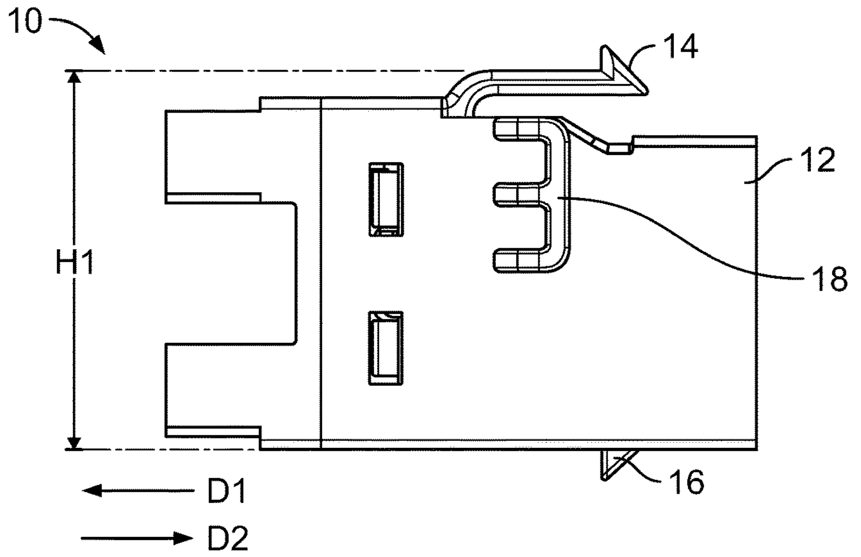
FIG. 26 (Prior Art)
FIG. 26 is a side view of the first jack type shown in FIG. 10.
Figure 27:
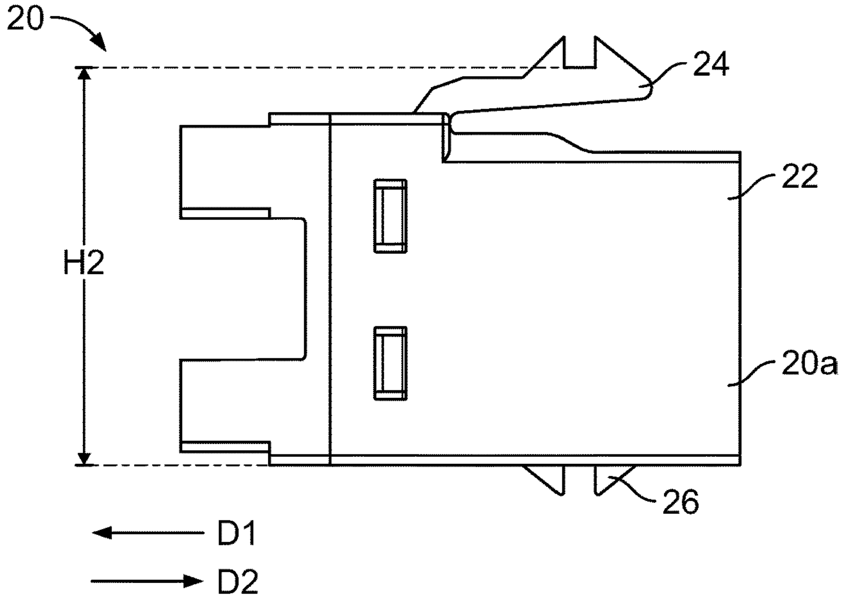
FIG. 27 (Prior Art)
FIG. 27 is a side view of the second jack type shown in FIG. 18.
Figure 28:
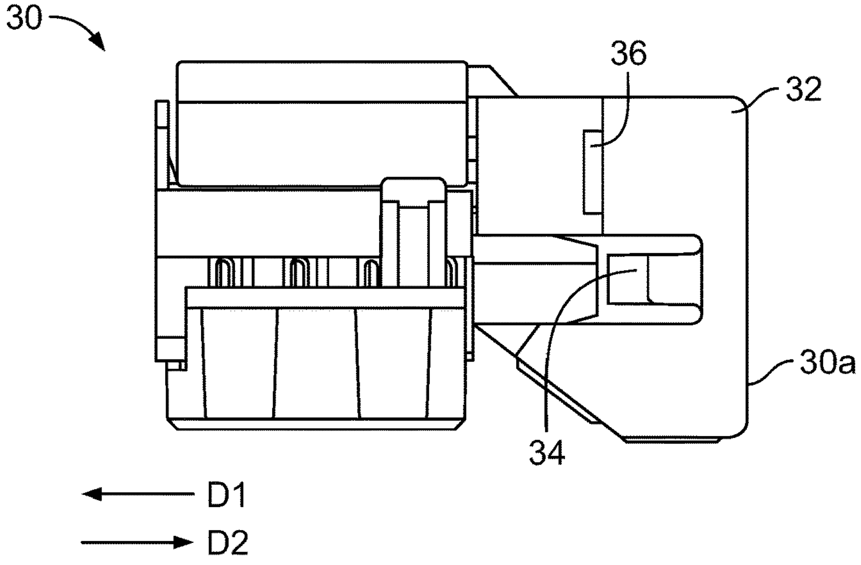
FIG. 28 (Prior Art)
FIG. 28 is a side view of a third jack type.
Figure 29:
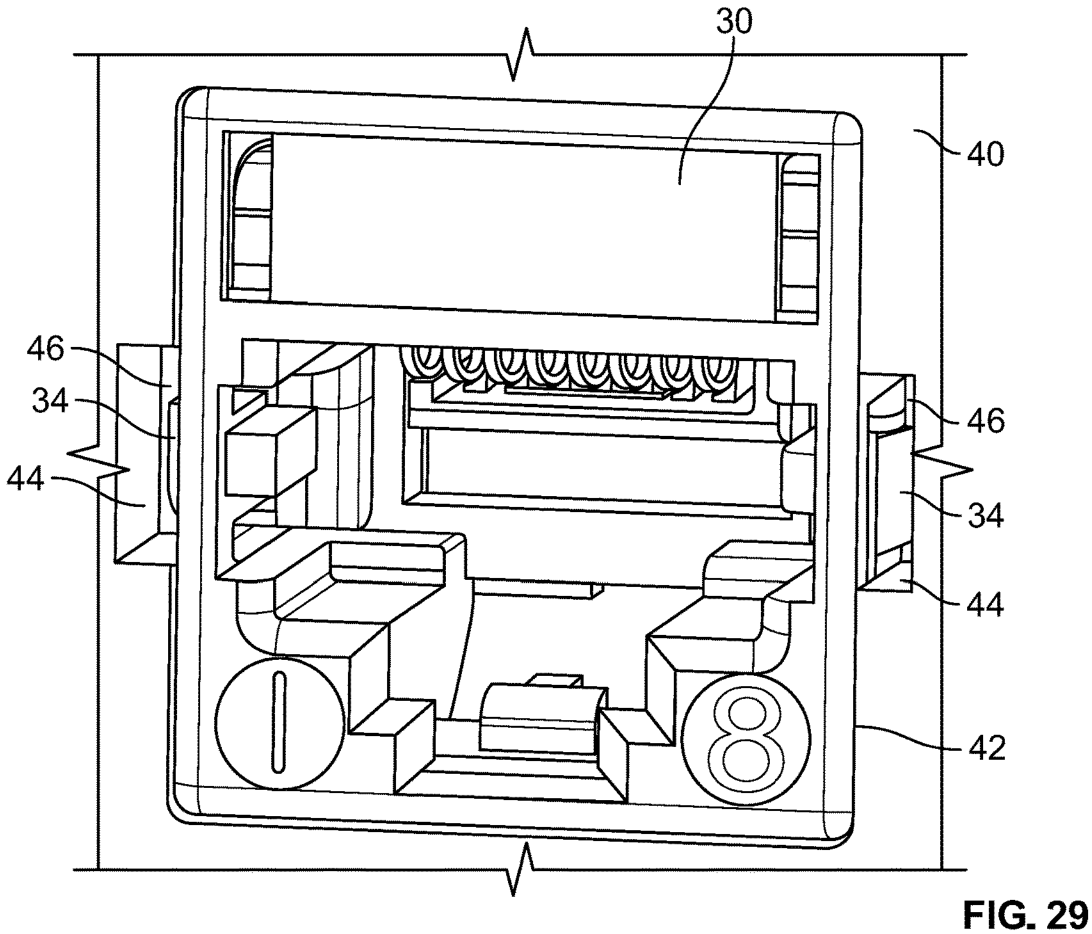
FIG. 29 (Prior Art)
FIG. 29 is a perspective front view of the third jack type shown in FIG. 28 installed within the opening structure shown in FIGS. 16 and 17.
Figure 30:
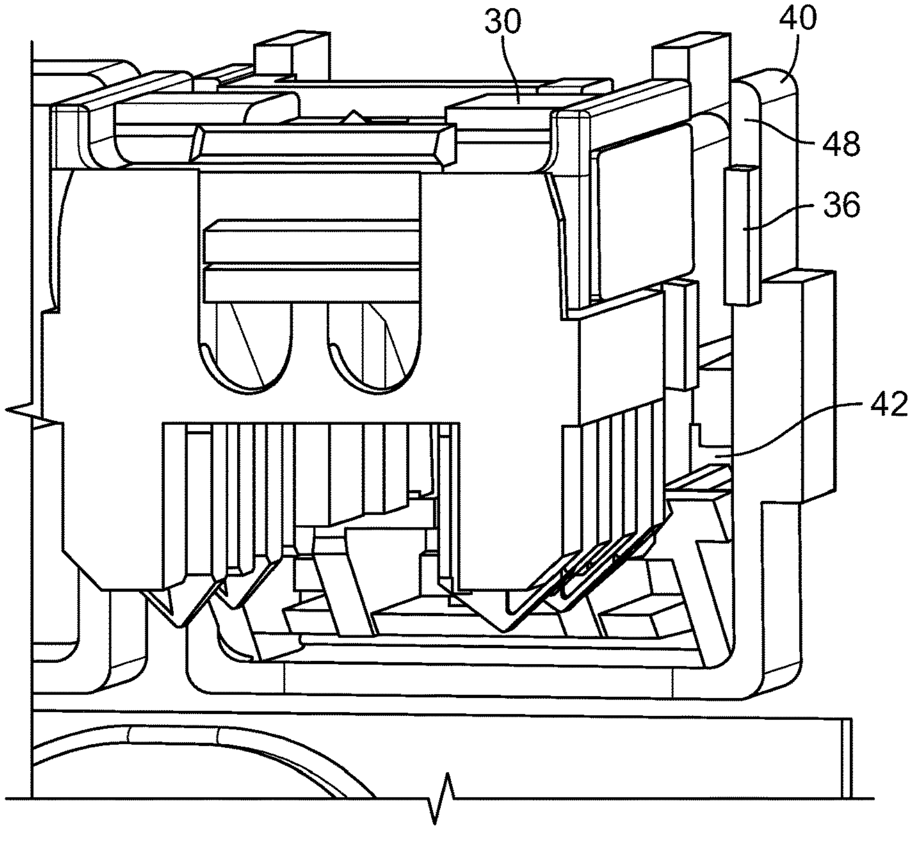
FIG. 30 (Prior Art)
FIG. 30 is a perspective rear view of the third jack type and opening structure shown in FIG. 29.

As shown, the adapter 100 includes a main body 102 having side structures 104, 106, 108, 110 that define a generally rectangular central passageway 112 for receiving and supporting either of the jacks 10, 20. In one aspect, the side structures 104, 106 each include a wall portion **104*a*, 106*a* defining a recess area 104*b*, 106*b* within which a deflectable latch member 104*c*, 106*c* extends from the wall portion 104*a*, 106*a*. The deflectable latch member 104*c*, 106*c* includes a flexible or deflectable arm portion 104*d*, 106*d* extending to a free end 104*e*, 106*e* and a catch portion or surface 104*f*, 106*f* located at the free end 104*e*, 106*e*, When the adapter 100 is received within the opening structure 40, as can be seen at FIGS. 16-17 and 24-25, the deflectable latch members 104*c*, 106*c* are received into recesses 44 such that the catch surfaces 104*f*, 106*f* engage with the catch surfaces 46 of the opening structure 40 in a snap-fit type of arrangement. The adapter 100 can be released from the opening structure 40 by deflecting the latch members 104*c*, 106*c* inwardly such that the catch surfaces 46 and 104*f*, 106*f* are disengaged from each other. As presented, the side structures 104, 106 each further define a spring arm 104*g*, 106*g* straddling across the recess 104*b*, 106*c*. The spring arm 104*g*, 106*g* adds structural stability to the adapter main body 102** at the rear end.

In one aspect, the spring arm 104*g*, 106*g* is configured as a curved or arch-shaped member with a central portion extending away from the central passageway 112. As related previously, keystone type jacks 10 and SL type jacks 20 differ in height, with the former requiring an opening structure having a height H1 and the latter requiring a height H2 which is greater than H1. In order for the adapter 100 to be able to accommodate both types of jacks 10, 20, the spring arms 104*g*, 106*g* provide a flexible feature which allows the adapter 100 to expand in height when an SL type jack 20 is inserted into the adapter 100. As constructed, the adapter 100 defines an opening structure between the side structures 108, 110 generally defining the height H1, when in a relaxed state, such that a keystone type jack 10 can be received into the adapter 100. When an SL type jack 20 is inserted into the adapter 100, the greater height of the jack forces the spring arms 104*g*, 106*g* to extend or flatten such that the height H2 for the jack 20 is achieved. In this state, slight bending of the side structures 104, 106 adjacent the recesses 104*b*, 106*b* also occurs. With such a construction, a single opening structure provided by the adapter 100 can be provided that can advantageously accommodate the two different jack types having different opening requirements.

Figure 10:
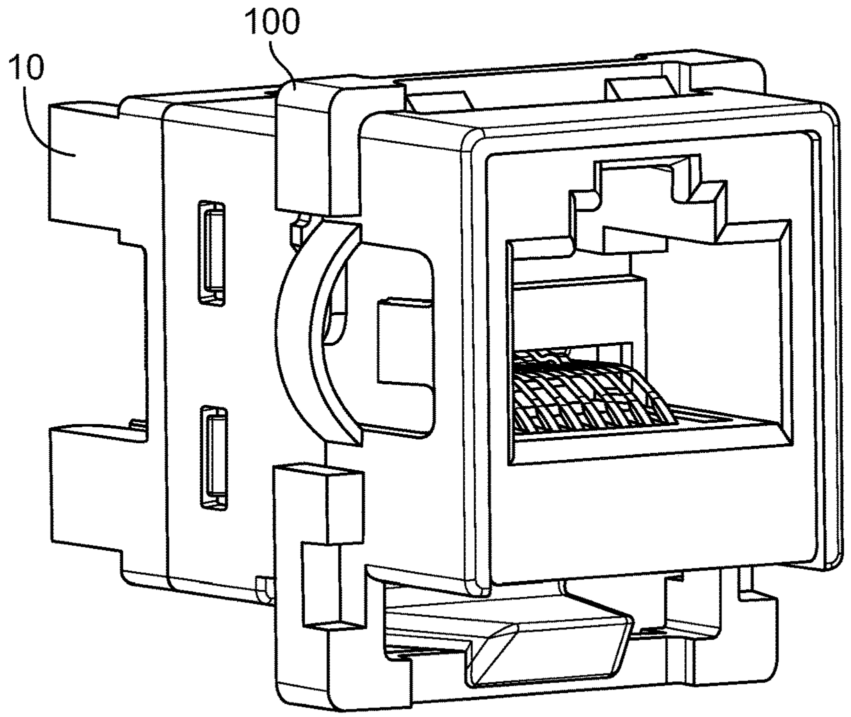
FIG. 10 is a front perspective view of an assembly including a first jack type secured to the adapter of FIG. 1.
Figure 11:
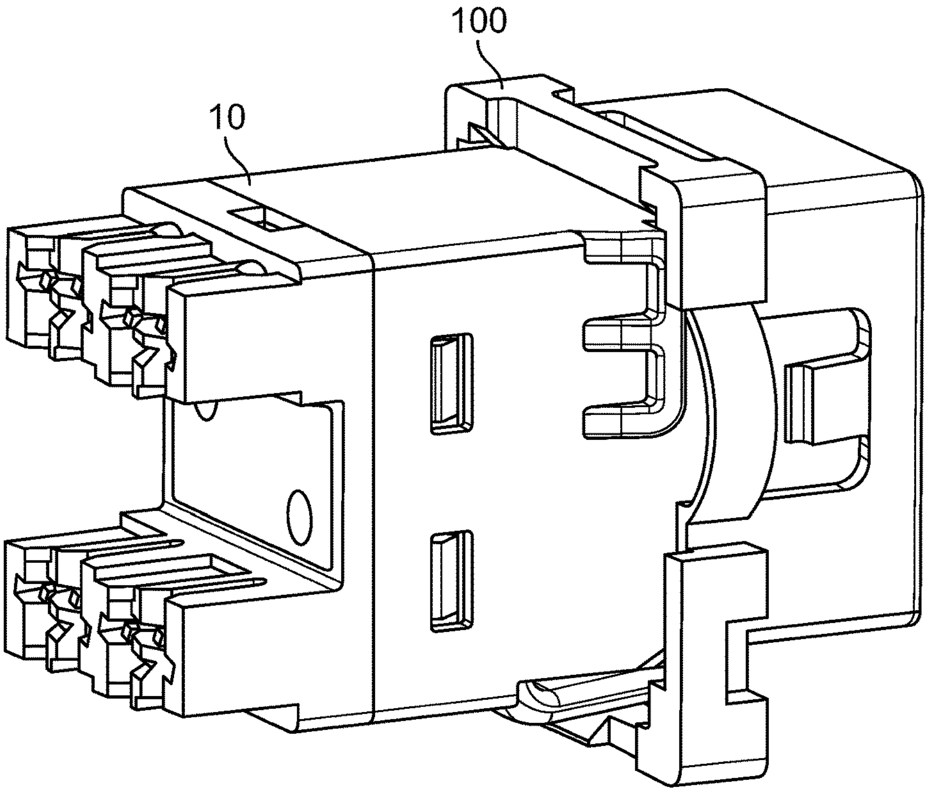
FIG. 11 is a rear perspective view of the assembly shown in FIG. 10.
Figure 12:
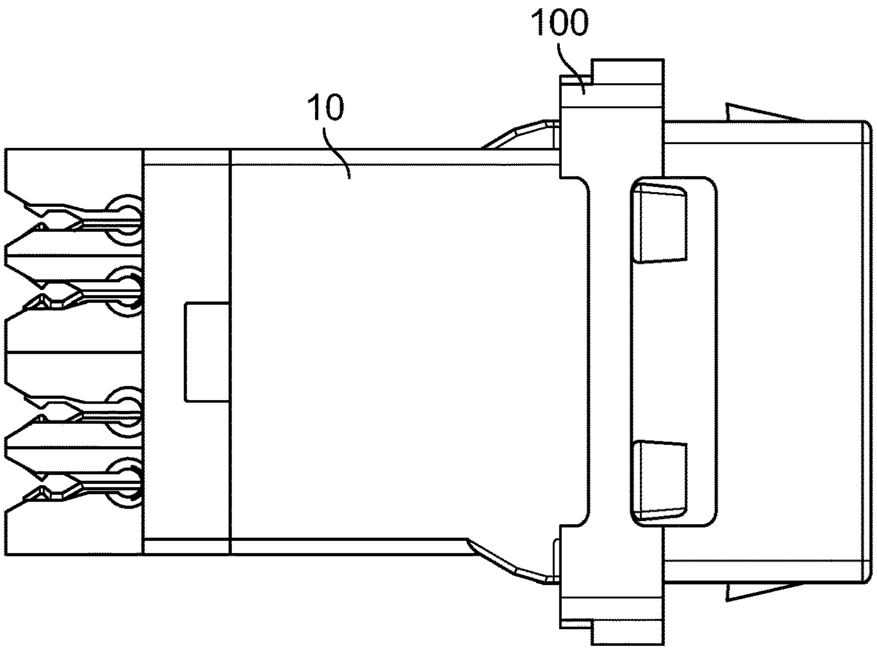
FIG. 12 is a top view of the assembly shown in FIG. 10.
Figure 13:
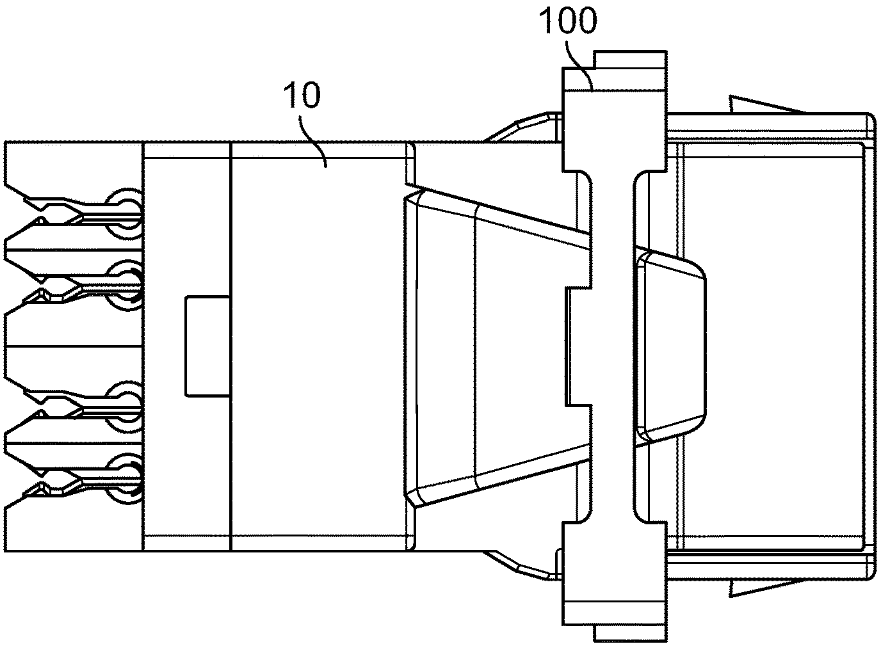
FIG. 13 is a bottom view of the assembly shown in FIG. 10.
Figure 14:
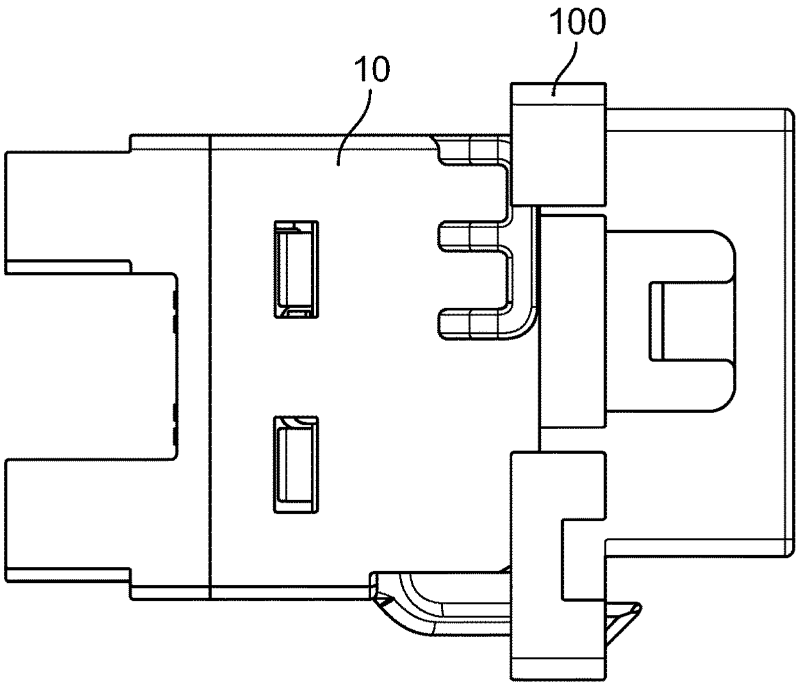
FIG. 14 is a side view of the assembly shown in FIG. 10.
Figure 15:
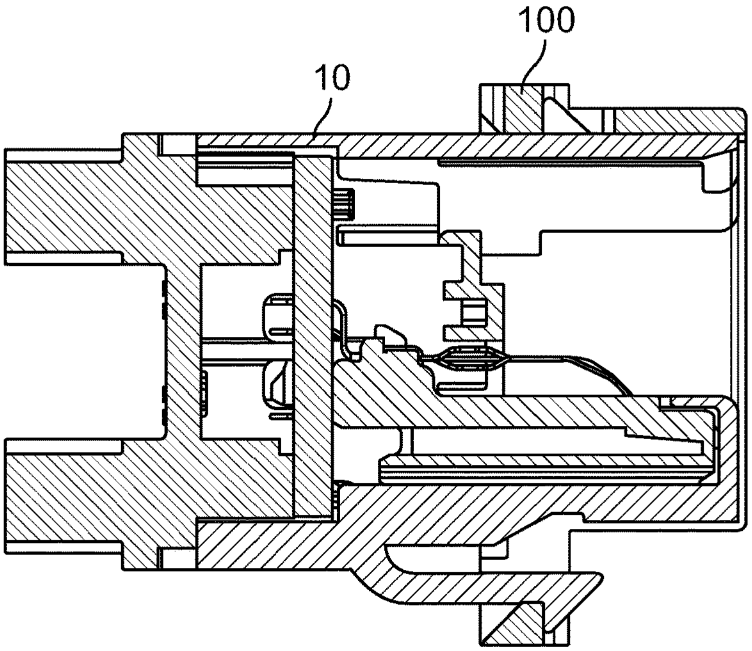
FIG. 15 is a cross-sectional side view of the assembly shown in FIG. 10.

The provided shape of the spring arms 104*h*, 106*h* also enables a front side 104*h*, 106*h* of the spring arm 104*g*, 106*g* to act as a stop surface against the rear-facing surface 48 of the opening structure 40 to prevent the adapter 100 and attached jack 10, 20 from being further inserted through the central passageway 42 in the direction D1, as is illustrated at FIGS. 16-17 and 24-25. As shown, the main body 102 defines additional stop surfaces 112 disposed about the central opening 112 that are coplanar with the sides 104*h*, 106*h*. Accordingly, the stop surfaces 112 can also abut the surface 48 to fix the position of the adapter 100 and attached jack 10, 20 relative to the opening structure 40. In one aspect, the spring arms 104*g*, 106*g* define a define rear sides 104*i*, 106*i* that act as a stop surface against the side stops 18 of a jack 10 to limit the insertion of the jack 10 in the direction D2 relative to the adapter 100, as is shown at FIGS. 10 to 17. To further aid in providing a positive stop against the side stops 18, the side structures 104, 106 may be provided with stop surfaces 106*j* which are coplanar with the rear sides 104*i*, 106*i*.

Figure 18:
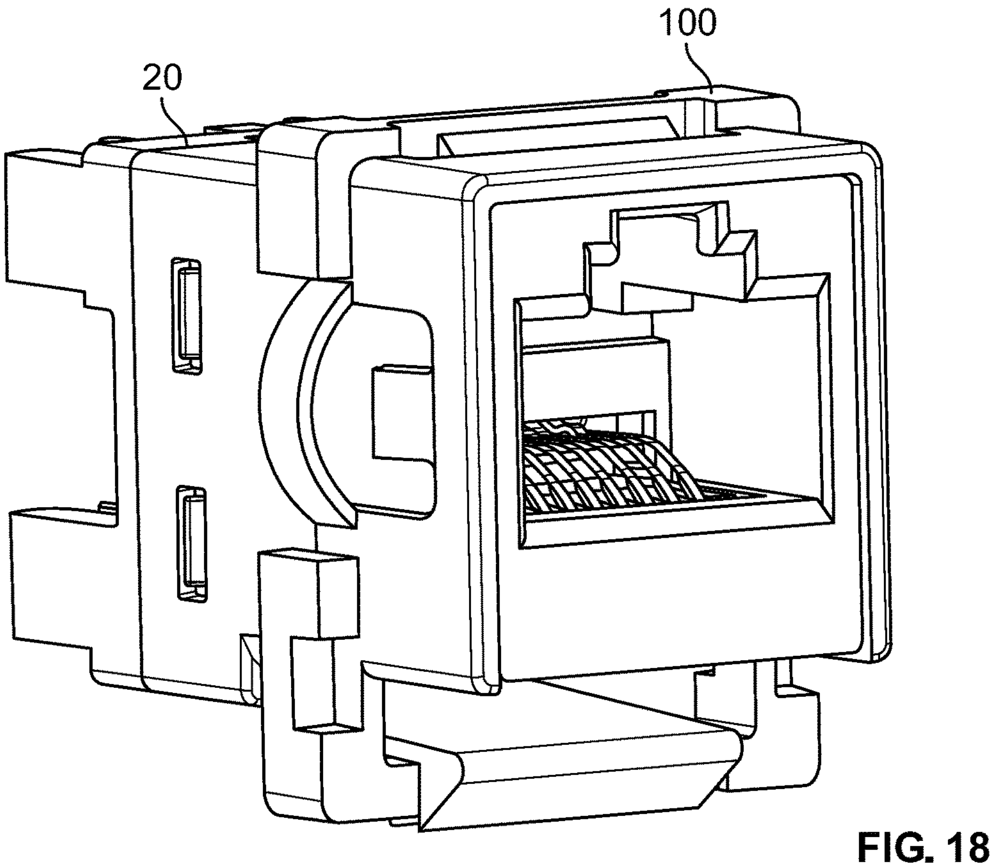
FIG. 18 is a front perspective view of an assembly including a second jack type secured to the adapter of FIG. 1.
Figure 19:
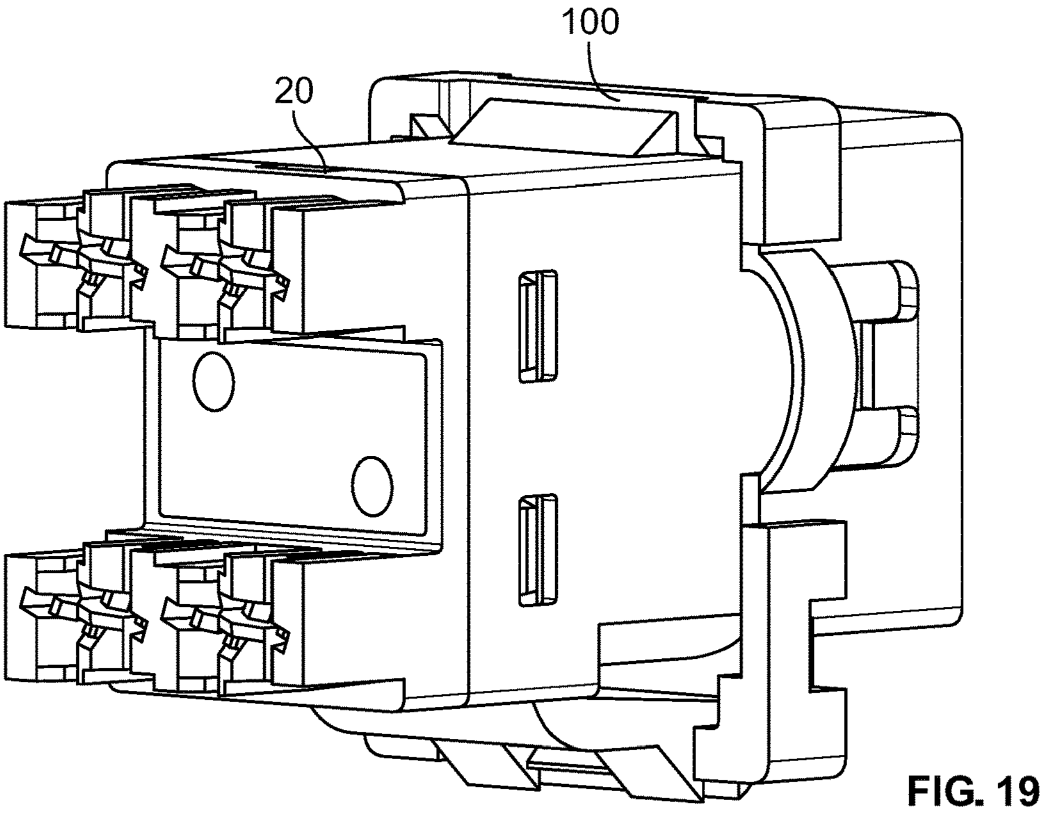
FIG. 19 is a rear perspective view of the assembly shown in FIG. 18.
Figure 20:
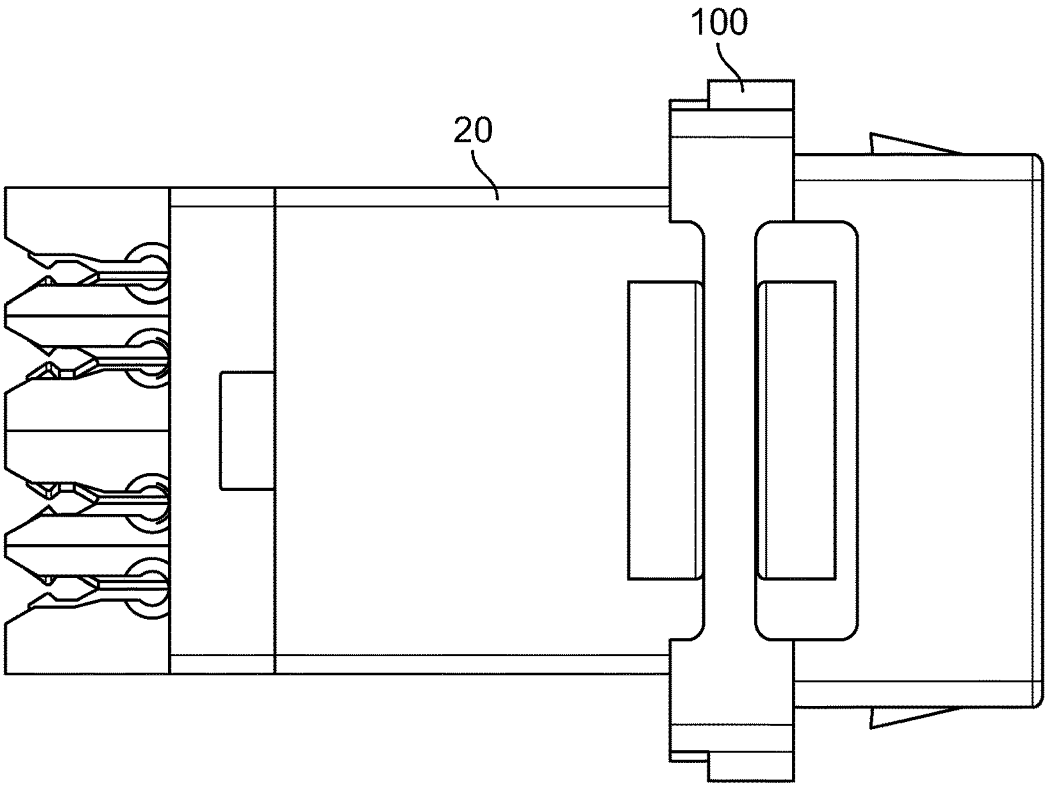
FIG. 20 is a top view of the assembly shown in FIG. 18.
Figure 21:
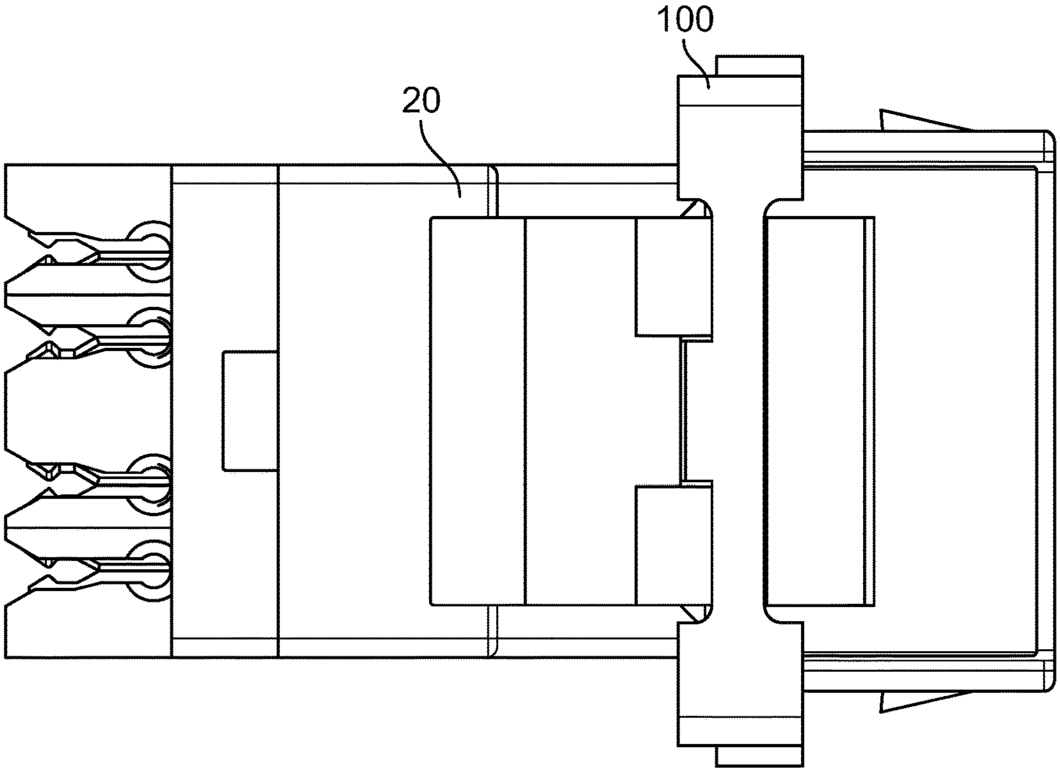
FIG. 21 is a bottom view of the assembly shown in FIG. 18.
Figure 22:
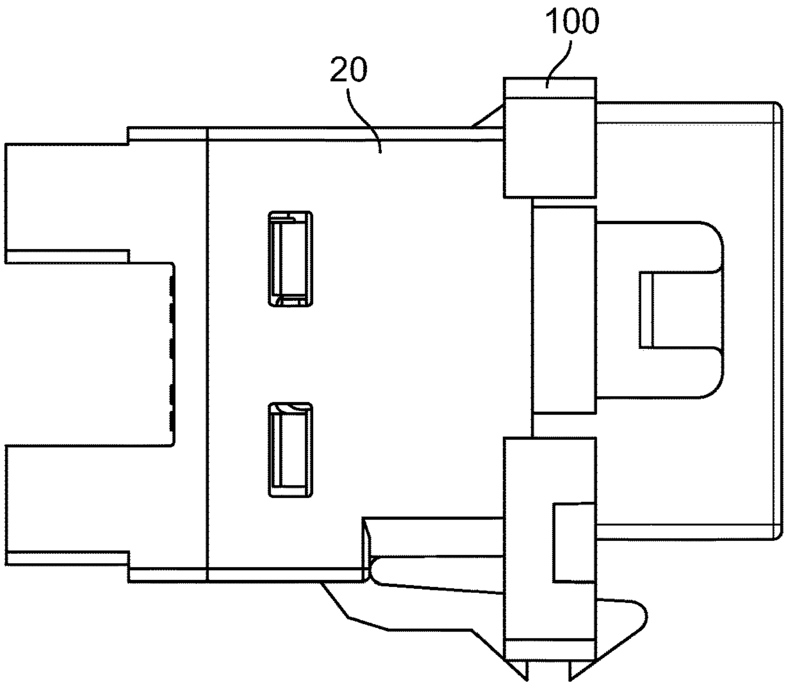
FIG. 22 is a side view of the assembly shown in FIG. 18.
Figure 23:
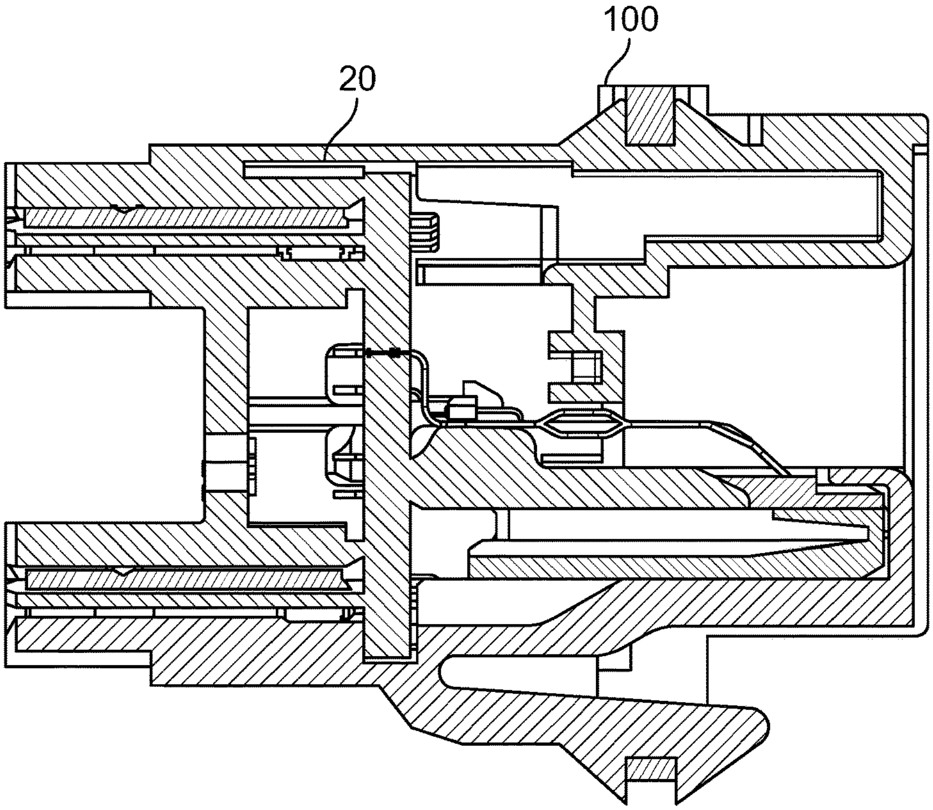
FIG. 23 is a cross-sectional side view of the assembly shown in FIG. 18.

In one aspect, the side structure 110 of the main body 102 includes a wall portion 110*a* extending between the side structures 104, 160. As shown, the wall portion 110*a* defines a recess or opening 110*b*. The wall portion 110*a* can be characterized as having a front portion 110*c* on one side of the recess 110*b* and a rear portion 110*d* on the other side of the recess 110*b*. The rear portion 110*d* can be further characterized as defining oppositely facing catch surfaces 110*e*, 110*f* that are generally disposed perpendicular to the wall portion 110*a*. As shown, the catch surface 110*e* faces towards the opening 110*b* while catch surface 110*f* faces way from the opening 110*b*. When a jack 10 is inserted into the adapter 100, the single-sided latch member 16 snaps into the opening 110*b* and catches against the catch surface 110*e* to prevent the jack 10 from being removed or separated from the adapter 100 in the first direction D1, as is illustrated at FIGS. 10 to 17. When a jack 20 is inserted into the adapter 100, the double sided latch member 26 snaps into the opening 110*b* and catches against both catch surfaces 110*e*, 110*f* to prevent the jack 20 from being removed or separated from the adapter 100 in the first and second direction D1, D2, as is illustrated at FIGS. 18 to 25.

In one aspect, the side structure 108 includes a member 108*a* extending between the side structures 104, 106. The member 108*a* can be characterized as defining oppositely facing catch surfaces 108*b*, 108*c* that are generally disposed generally parallel to the catch surfaces 110*e*, 110*f*. As shown, the catch surface 108*b* faces in the same direction as the catch surface 110*e* and towards a front end of the adapter 100. The catch surface 108*c* faces in the same direction as the catch surface 110*e* and towards a rear end of the adapter 100. When a jack 10 is inserted into the adapter 100, the single-sided latch member 16 snaps over the member 108*a* catches against the catch surface 108*b* to prevent the jack 10 from being removed or separated from the adapter 100 in the first direction D1, as is illustrated at FIGS. 10 to 17. When a jack 20 is inserted into the adapter 100, the double sided latch member 26 snaps over the member 108*a* and catches against both catch surfaces 108*b*, 108*c* to prevent the jack 20 from being removed or separated from the adapter 100 in the first and second direction D1, D2, as is illustrated at FIGS. 18 to 25. The side structure 108 can also be provided with a ramped surface 108*d* to enable a tool to be used to separate the latch member 14 or 24 from the side structure 108 when separation of a jack 10, 20 from the adapter 100 is desired.

Many materials can be used for the components of the disclosed components herein. For example, the components can be formed from polymeric materials, such as injection molded plastics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A telecommunications jack connection kit comprising:

an opening structure defining a first central passageway, the opening structure defining a first attachment arrangement for securing a first jack type within the first central passageway; and an adapter for connection to a second jack type and a third jack type, the adapter being configured for connection to the first attachment arrangement;

wherein the first, second, and third jack types have different connection arrangements for facilitating connection to the opening structure.

2. The telecommunications jack connection kit of claim 1, wherein the first attachment arrangement includes oppositely positioned recesses and catch surfaces located on opposite sides of the first central passageway, the catch surfaces being for engaging laterally positioned latch members of the first jack type.

3. The telecommunications jack connection kit of claim 1, wherein the first jack type is a COMMSCOPE M-series type jack, the second jack type is a keystone type jack, and the third jack type is a COMMSCOPE SL-series type jack.

4. The telecommunications jack connection kit of claim 1, wherein the adapter includes a main body defining a second central opening for receiving either of the first and second jack types.

5. The telecommunications jack connection kit of claim 4, wherein the adapter includes a pair of oppositely positioned deflectable latch members for engaging with catch surfaces of the first attachment arrangement, the pair of latch members being located on first and second side structures on the adapter.

6. The telecommunications jack connection kit of claim 5, wherein the adapter includes a third side structure extending between the first and second side structures, the third side structure defining oppositely facing catch surfaces for engaging with a deflectable latch member of the first or the second jack type.

7. The telecommunications jack connection kit of claim 6, wherein the adapter includes a fourth side structure extending between the first and second side structures, the fourth side structure defining oppositely facing catch surfaces for engaging with a fixed latch member of the first or the second jack type.

8. The telecommunications jack connection kit of claim 4, wherein the adapter includes a first stop surface for engaging with a corresponding stop surface of the opening structure.

9. The telecommunications jack connection kit of claim 4, wherein the adapter includes a second stop surface for engaging with a corresponding stop surface of the first jack type or the second jack type.

10. The telecommunications jack connection kit of claim 5, wherein the pair of deflectable latch members extend within a recess defined by the first and second side structures, and wherein the main body further includes a first spring arm straddling the first side structure recess and a second spring arm straddling the second side structure recess.

11. The telecommunications jack connection kit of claim 10, wherein the first and second spring arms each have a curved or arched shape.

12. A telecommunications jack adapter for enabling jacks of a first and second type to be inserted into an opening structure configured for a third jack type, the telecommunications jack adapter comprising:

a main body defining first, second, third, and fourth side structures, the side structures defining a central opening for receiving a jack;

a first deflectable latch member formed as part of the first side structure and a second deflectable latch member formed as part of the second side structure, the first and second deflectable latch members being configured to engage with the opening structure configured for the third jack type;

a first attachment arrangement for receiving and retaining a first jack type within the central opening, the first attachment arrangement being defined by a first catch surface defined in the third side structure, a second catch surface defined in the fourth side structure, and a first stop surface; and a second attachment arrangement for receiving and retaining a second jack type within the central opening, the second attachment arrangement being defined by the first and second catch surfaces, a third catch surface defined in the third side structure, and a fourth catch surface defined in the fourth side structure;

wherein the first, second, and third jack types have different connection arrangements for facilitating connection to an opening structure.

13. The telecommunications jack adapter of claim 12, wherein the first jack type is a COMMSCOPE M-series type jack, the second jack type is a keystone type jack, and the third jack type is a COMMSCOPE SL-series type jack.

14. The telecommunications jack adapter of claim 12, wherein the adapter includes a second stop surface for engaging with a corresponding stop surface of the opening structure.

15. The telecommunications jack adapter of claim 12, wherein the first and second deflectable latch members extend within a recess defined by the first and second side structures, and wherein the main body further includes a first spring arm straddling the first side structure recess and a second spring arm straddling the second side structure recess.

16. The telecommunications jack adapter of claim 15, wherein the first and second spring arms each have a curved or arched shape.

17. The telecommunications jack adapter of claim 16, wherein the first and second spring arms each define a portion of the first stop surface and wherein the first and second spring arms each define a second stop surface for engaging with a corresponding stop surface of the opening structure.

18. A telecommunications jack adapter for receiving multiple types of jacks, the jack adapter comprising:

an opening structure defining an expandable central opening for receiving a first jack type having a first height dimension and a second jack type having a second height dimension greater than the first height dimension;

a pair of flexible spring arms connected to the opening structure such that the central opening is located between the flexible spring arms;

wherein when the pair of flexible spring arms are in a relaxed state, the central opening has a first opening height corresponding to the first height dimension and wherein when the pair of flexible spring arms are in an expanded state, the central opening has a second opening height corresponding to the second height dimension.

19. The telecommunications jack adapter of claim 18, wherein:

the opening structure is defined by first, second, third, and fourth side structures;

the main body further includes a first deflectable latch member formed as part of the first side structure and a second deflectable latch member formed as part of the second side structure, the first and second deflectable latch members being configured to engage with a second opening structure configured for receiving a third jack type.

20. The telecommunications jack adapter of claim 18, wherein the pair of flexible spring arms each have a curved or arched shape.

21. The telecommunications jack adapter of claim 18, wherein the pair of flexible spring arms each define a portion of a first stop surface.

22. The telecommunications jack adapter of claim 18, wherein the pair of flexible spring arms each define a second stop surface for engaging with a corresponding stop surface of the opening structure.

* * * * *